April 20, 1965    J. V. McKILLIP, JR    3,179,085

DRINKING DEVICE FOR ANIMALS

Filed July 29, 1963

INVENTOR.
JAMES V. McKILLIP, JR.
BY
ATTORNEY

United States Patent Office 3,179,085
Patented Apr. 20, 1965

3,179,085
DRINKING DEVICE FOR ANIMALS
James V. McKillip, Jr., 1704 Pin Oak Drive,
Cedar Falls, Iowa
Filed July 29, 1963, Ser. No. 298,329
1 Claim. (Cl. 119—75)

This invention relates to a drinking device for animals, and more particularly to an improved self-actuated device by which animals, such as livestock, are provided with drinking water at all times.

The prior art contains many different types of devices designed to provide drinking water for animals. Most of these devices are of the type that have a bowl from which the animal drinks, the water being supplied to the bowl either automatically through a float-operated valve or through a valve operated by the animal with his nose. When installed outside in climates other than temperate, these devices must be provided with heaters to prevent the reservoir of water from freezing during periods of low temperature. Also, with devices of this type, the reservoir of water may become stagnant and contaminated with foreign matter. Therefore, many improvements have been made in the reservoir-type devices to help keep the water fresh and to make them easier to clean and keep clean. Such improvements have not completely solved these difficult problems because their solution is complicated by the habits of the animals and the environment in which they live. An additional problem with the reservoir-type drinking device is the temptation offered by the standing water for the animals to play in it. This further contaminates the water as well as causing waste.

Moreover, improvements made in an attempt to solve these problems of the reservoir-type drinking device add to the cost of these devices, and in some cases make them more difficult and costly to install. Some are also expensive to maintain because of the electricity or gas that is necessary to provide heat to keep the reservoir of water from freezing.

It is important, particularly with livestock, to provide the animals with clean, fresh water at all times. Some animals are surprisingly particular about the quality of their drinking water and may refuse to drink poor water.

It is therefore a principal object of my invention to provide an improved self-actuated drinking device for animals which will provide the animals with fresh clean water at all times.

It is another object of my invention to provide a drinking device for animals which eliminates the cleaning and draining problems normally encountered with devices of this type.

It is a further object of my invention to provide a drinking device for animals that greatly reduces the heat required to keep the water supply from freezing. In some cases, use of my novel drinking device eliminates the need for heating means.

It is a still further object of my invention to provide a drinking device for animals that will assure a supply of fresh clean water at all times. Since the device eliminates the need for a reservoir, it is impossible for the water to become contaminated or stagnant.

It is another object of my invention to provide a drinking device that can be simply adjusted for proper operation with different animals and one in which the flow of water can be easily regulated.

It is a still further object of my invention to provide an improved self-actuated drinking device for animals that is extremely simple and economical to manufacture and one that can be easily and inexpensively installed.

These and other objects of my invention will be readily apparent from a consideration of the following description taken in connection with the accompanying drawings in which.

Figure 1:
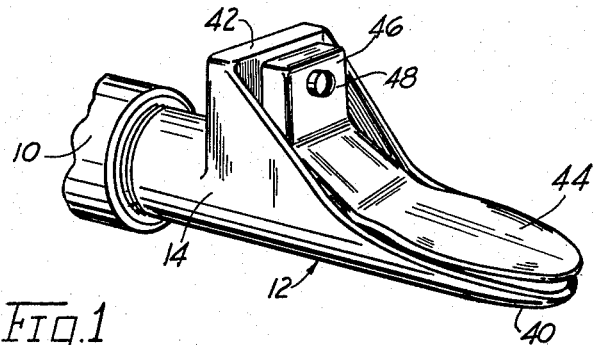
FIG. 1 is a perspective view of a drinking device constructure according to my invention.

Referring now to the drawings, the illustrated embodiment of my novel device is adapted for direct connection to a pipe line 10 carrying a supply of water under pressure. The device consists of a main body 12 that has a tubular end 14 externally threaded for connection to the pipe line 10. The tubular end 14 has a longitudinally extending passageway 16 in which there is positioned a valve, indicated generally by the reference numeral 18. Valve 18 has an actuating rod 20 that extends longitudinally through the passageway 16. Rod 20 has affixed to one end thereof a valve member 22 which engages a tapered valve seat 24 at the outer end of the passageway 16. The valve member 22 is secured to the actuating rod 20 by any suitable means such as screw 26.

Figure 2:
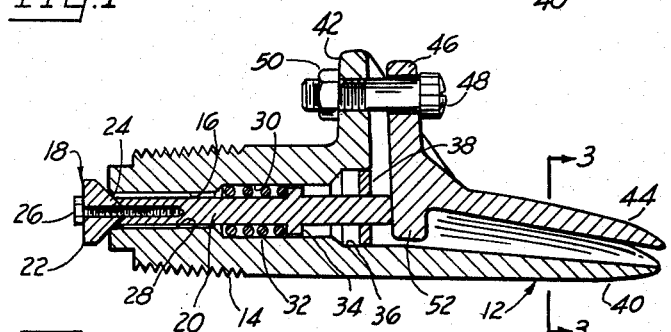
FIG. 2 is a longitudinal sectional view of the device.
Figure 3:
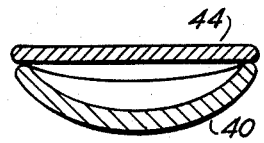
FIG. 3 is a sectional view taken along the line 3—3 of FIG. 2.

The passageway 16 is stepped, the narrowest portion 28 being slightly larger in diameter than the rod 20 so as to permit the flow of water through the passageway 16 from end to end when the valve member 22 is unseated from its seat 24. The middle portion 30 of passageway 16 is enlarged to receive a resilient member such as coil spring 32, one end of which engages the shoulder formed in the stepped passageway 16 between portions 28 and 30. The other end of spring 32 engages a shoulder 34 on the valve rod 20 to bias the rod 20 to the right (FIG. 2) and thereby maintain valve member 22 seated on seat 24. Thus, passageway 16 is normally close off to the flow of fluid from pipe line 10.

At its inner end, the passageway 16 terminates in its largest diameter portion 36. A guide member 38 for the valve rod 20 is fitted into portion 36 with the rod 20 passing through an opening in the center of the guide 38. The guide 38 is pressed into the enlarged portion 36 and is preferably of a non-circular shape, such as hexagonal, to permit the flow of fluid between the guide 38 and the walls defining passageway 16.

At the other end of the main body 12 there is formed preferably integrally with the tubular portion 14 an outwardly extending member which I have termed the lower blade 40. This blade 40 is preferably of a somewhat curved shape in cross section so as to provide a trough from the passageway 16 to the outer end of blade 40. The shape and size of the blade 40 depends partially upon the particular animal for which the device is designed. At the top of the main body 12 there is formed an upwardly extending shoulder 42 to which there is pivotally connected the upper blade 44. The upper blade 44 has an upwardly extending shoulder 46 juxtaposed to shoulder 42 and through which a pin 48 extends connecting the upper blade 44 to the main body 12. The pin 48 is threaded into shoulder 42 and the opening in shoulder 46 is slightly larger than the pin 48 for a purpose that will be evident from the description hereinafter. A nut 50 or other suitable fastener is preferably provided on the threaded end of pin 48 to lock it in place. The upper blade 44 is positioned above and spaced from the lower blade 40 and has a flange 52 extending downwardly from the shoulder 46. The back side of flange 52 engages the inner end of the valve rod 20.

From the description, it is evident that the upper blade 44 is movable relative to the lower blade 40 about the pin 48, and when forced downwardly toward the blade 40, the flange 52 of the upper blade 44 will push the actuating rod 20 of the valve 18 to the left (FIG. 2) thereby unseating the valve member 22 and permitting water to flow through the passageway 16 and down through the space between the two blades 40 and 44. The valve spring 32 will return the rod to the right (FIG. 2) when the force on blades 40 and 44 is released and will also push the upper blade 44 upwardly away from the lower blade 40.

When properly connected to a supply of water under pressure, the operation of the device is as follows. When an animal desires to obtain a drink of water, he places his mouth around the upper and lower blades 44 and 40 and squeezes them together. This the animal can easily learn to do and does almost instinctively. The upper blade 44 will be pivoted downwardly moving the valve actuating rod 20 to the left, unseating the valve member 22 and permitting water to flow through passageway 16 between blades 40 and 44 and into the animal's mouth. When the animal has had sufficient water, he will release his grip on the blades 40 and 44 and the spring 32 will return the actuating rod to the right seating the valve member 22 and shutting off the flow of water.

The use of the threaded pin 48 provides an adjustability feature for the device. As pin 48 is threaded into shoulder 42, the upper blade 44 is pivoted upwardly increasing the distance between it and the lower blade 40. Since the lower blade 40 acts as a stop for movement of the upper blade 44, tightening of pin 48 allows blade 44 to be moved a greater distance thereby increasing the amount valve member 22 can be moved off its seat 24. Thus, more water can flow into the animal's mouth. Similarly, loosening of pin 48 will limit the maximum amount of water that can flow from the device. This construction therefore provides a very simple way to regulate the maximum flow desired for the particular animals using the device. The action of spring 32 also permits the animal to vary the amount of water according to the pressure he applies to the blades.

The specific sizes and shapes of the upper and lower blades 40 and 44 can be designed to fit comfortably the mouth of almost any animal. Since the flow of water is directly from the pipe line 10 to the mouth of the animal, no reservoir is needed thus eliminating the problems of keeping the water clear. Also, the device itself is self-cleaning. The problem of preventing freeze-up in cold weather is greatly simplified because there is no reservoir. No expensive heating elements are needed, and as long as the pipe line 10 is kept from freezing, the device will operate in even the coldest weather.

My novel device also has another advantage in some cases. "Ringed" hogs and cattle are sometimes reluctant to use devices of the type in which the water valve is actuated by pushing a lever with their noses. This is uncomfortable and sometimes will keep the animals from drinking.

The device of my invention is not actuated until it is inside the animal's mouth, and thus only the amount of water that the animal actually drinks will be used. This minimizes waste and the "playing" that sometimes occurs with other types of drinking devices.

Figure 4:
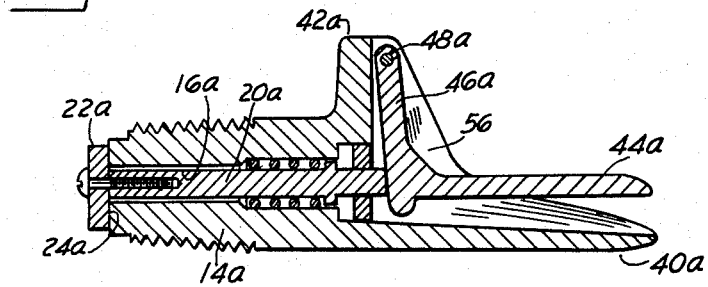
FIG. 4 is a sectional view similar to FIG. 2 but showing certain modifications of the device.

In FIG. 4 I have shown a slightly modified version of my device. This embodiment is very similar to that of the first embodiment and parts corresponding to those of the first embodiment will be referred to by the same reference numbers followed by the subscript "a." The device has a tubular end 14a externally threaded for connection to a pipe line and having a passageway 16a containing a valve 18a. The valve 18a is very similar to the valve 18 of the first embodiment except that it is adapted for use with lower water pressures and thus the valve member 22a is not tapered but merely abuts the tubular end 14a which provides the valve seat 24a.

Also, the upper blade 44a is affixed to the shoulder 42a in a slightly different manner. Shoulder 42a has side portions 56 each of which contains an opening to receive a pin 48a that passes from side-to-side through the upper shoulder 46a of the upper blade 44a. In this embodiment, no adjustment can be made to regulate the flow of water. However, in all other respects the device is identical in operation to the device of the first embodiment.

It is evident from the above description that my novel device is quite unique and eliminates many of the problems of the prior art devices. Those familiar with this art will appreciate the features of my invention and the fact that the elimination of the need for a reservoir greatly reduces the cost of manufacture of this device. The device is easily installed requiring only that it be threaded into an appropriate fitting in the pipe line. Those familiar with the use of such devices will also appreciate the fact that the device does not require cleaning and will always furnish a supply of fresh water for the animals.

While my invention has been described in connection only with certain preferred embodiments it is obvious that some modifications and revisions can be made to the device without departing from the spirit and scope of the invention. It is my intention therefore that such revisions and modifications as are obvious to those skilled in the art will be included within the scope of the following claim.

I claim:

A watering device for hogs and the like comprising an elongated main body having a longitudinally extending horizontal passageway therethrough, a valve seat on the outer end of said main body around the opening to said passageway, a valve rod extending through to the inner end of and movable in said passageway, a valve member connected to said rod at the outer end of said passageway and engageable with said valve seat, spring means engageable with said valve rod to bias said valve against said seat, a trough-shaped lower blade integral with said main body and extending substantially horizontally outwardly therefrom at a point near the inner end of said passageway, said lower blade providing a trough that slopes slightly downwardly from the main body so that water flowing from said passageway will be discharged from the device, a shoulder on said main body extending upwardly from a point near the inner end of said passageway and transversely of said passageway, an upper blade having an upwardly extending flange positioned adjacent the shoulder of said main body, a longitudinal member extending transversely through said shoulder and said flange and pivotally connecting said flange to said shoulder, said upper blade being juxtaposed in spaced relation to said lower blade and of a length at least as long as said lower blade, said upper blade being capable of movement up-and-down as said flange pivots about said longitudinal member and having a portion engageable with said valve rod so that said upper blade is biased away from said lower blade by said spring means, said longitudinal member being adjustable to vary the spacing between said flange and said shoulder so as to regulate the amount said valve member can be unseated when said valve rod is moved as said upper blade is depressed, said upper and lower blades being of a size and shape to be simultaneously and comfortably gripped by a hog in his mouth, and means for connecting said device to a source of water with said passageway selectively in communication with said source.

References Cited by the Examiner

UNITED STATES PATENTS

| 1,674,811 | 6/28 | Turner | 119—75 |
| 1,986,928 | 1/35 | Hanson | 119—75 |
| 3,043,267 | 7/62 | Blough | 119—75 |

FOREIGN PATENTS 509,063  2/52  Belgium.

SAMUEL KOREN, Primary Examiner.

HUGH R. CHAMBLEE, Examiner.